United States Patent [19]

Langfeld et al.

[11] Patent Number: 5,116,955
[45] Date of Patent: May 26, 1992

[54] PROCESS FOR THE PREPARATION OF MONO- AND POLYAZO DYES

[75] Inventors: Horst Langfeld; Roland Minges, both of Grenzach-Wyhlen, Fed. Rep. of Germany

[73] Assignee: Ciba-Geigy Corporation, Ardsley, N.Y.

[21] Appl. No.: 587,385

[22] Filed: Sep. 25, 1990

[30] Foreign Application Priority Data

Sep. 30, 1989 [DE] Fed. Rep. of Germany ....... 3932829

[51] Int. Cl.$^5$ .............................................. C09B 27/00
[52] U.S. Cl. ................... 534/582; 534/683; 534/685; 534/688
[58] Field of Search ................ 534/582, 683, 685, 688

[56]     References Cited

U.S. PATENT DOCUMENTS 3,189,593  6/1985  Wicki et al.
4,521,216  6/1985  Armbrust ............................. 8/639
4,638,055  1/1987  Bergmann et al. ................. 534/678

FOREIGN PATENT DOCUMENTS 1306836  2/1973  United Kingdom.
1499745  2/1978  United Kingdom.

OTHER PUBLICATIONS

H. R. Schweizer, Kunstliche Organische Farbstaffe Springer-Verlag (1964) pp. 422 & 423.
57th Handbook of Chemistry & Physics (1976–1977) pp. D133–D135.

Primary Examiner—Marianne Cintins
Assistant Examiner—Jessica Nguyen
Attorney, Agent, or Firm—Marla J. Mathias; Edward McC. Roberts

[57]     ABSTRACT

There is disclosed a process for coupling one or more different diazo components with resorcinol on an industrial scale. The process comprises adjusting and stabilizing the coupling pH of the resorcinol prior to the reaction with the aid of a buffer system and keeping it constant during the coupling reaction or reactions by controlling the ratio of flow of the streams of the diazo component or components and the base. The process makes it possible to prepare mono- and polyazo dyes in excellent uniform quality and yield.

16 Claims, No Drawings

PROCESS FOR THE PREPARATION OF MONO- AND POLYAZO DYES

The present invention relates to a process for coupling one or more different diazo components with resorcinol, in which process in particular polyazo dyes can be prepared on an industrial scale in excellent uniform quality.

Coupling diazo components to resorcinol is known per se, the reaction proceeding exceedingly rapidly on account of the extraordinary couplability of resorcinol. Resorcinol has several coupling positions and can therefore be coupled to several, but not more than three, identical or different diazo components. The coupling positions and the reactivity of the individual coupling species are first and foremost contingent on the pH of the coupling. In particular, if different diazo components are coupled in succession to resorcinol, some of which diazo components may even themselves be couplable, then, depending on the pH, very different products or product mixtures can be obtained. In view of the standardised manufacture of such polyazo dyes, this circumstance gives rise to the requirement that the pH must be very exactly controlled within a narrow range during the coupling reaction, as otherwise the resultant product will vary from batch to batch with respect to composition, shade and physico-chemical properties such as solubility, i.e. standardisation is not achieved or at least is difficult to achieve.

Known industrial resorcinol coupling processes often do not make allowance for this circumstance. Although the endeavour is made to keep the adjusted pH of the coupling constant by neutralising the acid present in the stream of the diazo compound and which forms during the coupling by the separate addition of a base, the measures taken often do not suffice to be able to control and/or stabilise the pH of the coupling reaction effectively. In particular, complications in one of the feed lines, such as blockage, drop in pressure, deviation from the specified concentration and the like, can easily lead to deviations in the pH of the reaction from the nominal value. Further deviations from the nominal value may occur when the process is carried out under adiabatic conditions because the pH is temperature-dependent and decreases with increasing temperature. Finally, the pH inside the reactor is also not homogeneous despite stirring and is, for example, more acid in the region of the stream of the diazo compound and more alkaline in the region of the stream of base.

As described above, any fluctuations in the pH, even if only brief ones, in the known processes can lead to products which differ markedly in quality from the standard type. Such differences have usually been tolerated up to now and attempts to correct or alleviate them were made by troublesome shading. Modern plants with standardised production lines no longer permit such a procedure. On the contrary, the object is to carry out the manufacture of the dyes so reproducibly that the products can be further processed to the final dye without complicated aftertreatments. Hence there is a need for an improved process for the reproducible preparation of polyazo dyes on the basis of resorcinol on an industrial scale. The present invention makes such a process available.

Specifically, the present invention relates to a process for coupling one or more diazo components with resorcinol by charging a reactor with an aqueous solution of resorcinol, adjusting the coupling pH to the desired value and running in separately from each other a) the mineral acid containing solution of the diazotised diazo component or, in succession, the mineral acid containing solutions of the different diazotised diazo components, and b) the solution of a base, which process comprises carrying out the coupling reaction under adiabatic conditions and adjusting and stabilising the coupling pH of the resorcinol prior to the reaction with the aid of a buffer system, and keeping the pH constant during the coupling reaction by controlling the flow ratio of the streams a) and b).

Suitable diazo components for the process of this invention are, typically, 1- or 2-naphthylamines or aminobenzenes, which diazo components may carry one or more identical or different substituents. Exemplary of substituents of the 1- or 2-naphthylamine or aminobenzene are: $C_1$–$C_4$alkyl, for example methyl, ethyl, n- or isopropyl or n-, iso-, sec- or tert-butyl; $C_1$–$C_4$alkoxy, for example methoxy, ethoxy, n- or isopropoxy or n-, iso-, sec- or tert-butoxy; amino, N-mono- or N,N-di-$C_1$–$C_4$alkylamino; phenylamino, wherein phenyl is unsubstituted or substituted by, typically, sulfo, nitro, $C_1$–$C_4$alkyl, $C_1$–$C_4$alkoxy or halogen; halogen, for example fluoro, bromo and, preferably, chloro; trifluoromethyl; hydroxy; sulfo; nitro; cyano; carboxy; phenoxy; $C_1$–$C_4$alkylsulfonyl, for example methyl- or ethylsulfonyl; sulfamoyl; N-mono- or N,N-di-$C_1$–$C_4$alkylsulfamoyl; carbamoyl, N-mono- or N,N-di-$C_1$–$C_4$alkylcarbamoyl; $C_1$–$C_4$alkanoylamino, for example acetylamino, propionylamino; $C_1$–$C_4$alkoxycarbonyl, for example methoxy- or ethoxycarbonyl. Preferred diazo components for the process of this invention are 1- or 2-naphthylamines and/or aminobenzenes, which are each unsubstituted or further substituted, for example by sulfo, nitro, $C_1$–$C_4$alkyl, $C_1$–$C_4$alkoxy, carboxy, hydroxy, halogen or by phenylamino which may be substituted in the phenyl moiety by nitro, sulfo, $C_1$–$C_4$alkyl, $C_1$–$C_4$alkoxy or halogen.

Especially preferred diazo components for the process of this invention are:

a) compounds of formula

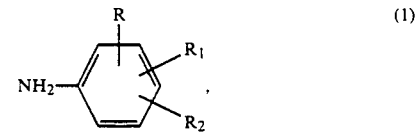

wherein R, $R_1$ and $R_2$ are each independently of one another hydrogen, chloro, nitro, methyl, methoxy, sulfo, hydroxy or carboxy;

b) compounds of formula

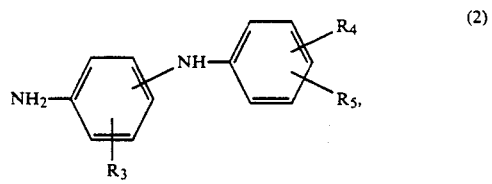

wherein $R_3$ is hydrogen or sulfo and $R_4$ and $R_5$ are each independently of the other hydrogen, sulfo, nitro, methyl, methoxy or chloro;

c) compounds of formula

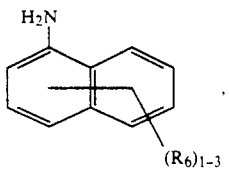

(3)

wherein $R_6$ is 1 to 3 identical or different substituents selected from the group consisting of hydroxy, sulfo, chloro and nitro; and d) compounds of formula

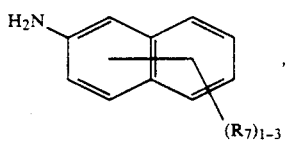

(4)

wherein $R_7$ is 1 to 3 identical or different substituents selected from the group consisting of sulfo and hydroxy.

Exemplary of especially preferred diazo components are: 1-amino-8-hydroxynaphthalene-3,6- or -4,6-disulfonic acid, 1-amino-2-hydroxynaphthalene-4-sulfonic acid, 1-amino-2-hydroxy-6-nitronaphthalene-4-sulfonic acid, o-, m- or p-nitroaniline, 4'-amino-4-nitrodiphenylamine-2-sulfonic acid, 4'-amino-2-sulfodiphenylamine, 6-nitro-4-sulfo-2-aminophenol, 4-nitro-6-sulfo-2-aminophenol, 4,6-dinitro-2-aminophenol, 4- or 5-nitro-2-aminophenol, 4-chloro-6-nitro-1-aminophenol, 6-chloro-4-nitro-2-aminophenol and sulfanilic acid.

The process of this invention is especially suitable for the preparation of polyazo dyes, i.e. for coupling resorcinol with, in succession, two or more than two, preferably two, three or four, most preferably three, different diazo components.

A preferred embodiment of the process of this invention comprises coupling in succession two or four or, preferably, three, different diazo components selected from the group consisting of 1-amino-8-hydroxynaphthalene-3,6-disulfonic acid, o-, m- or p-nitroaniline, 4'-amino-4-nitrodiphenylamine-2-sulfonic acid, 6-nitro-4-sulfo-2-aminophenol, 4-nitro-6-sulfo-2-aminophenol and 4- or 5-nitro-2-aminophenol, with resorcinol.

The process is conveniently carried out in a slightly acid, neutral or alkaline coupling pH range, i.e. in a pH range from 3 to 12, the preferred medium for the coupling reaction being a neutral or alkaline medium and, most preferably, a slightly alkaline medium, i.e. a medium which has a pH in the range from 7.5 to 12, preferably from 8.0 to 9.0 and, most preferably, from 8.2 to 8.8. The coupling pH of the resorcinol charged to the reactor is adjusted and stabilised with a suitable buffer system. Particularly suitable buffer systems are the per se known buffer systems consisting of a weak acid with a salt thereof. In principle, all buffer systems within a desired pH range are suitable. Typical examples of such buffer systems are acetic acid/acetate, phthalate/hydrogenphthalate, citric acid/citrate, diethylbarbituric acid/diethyl barbiturate, hydrogenphosphate/dihydrogenphosphate, carbonate/hydrogencarbonate, boric acid/borate and phosphate/hydrogenphosphate.

The preparation of the above as well as further buffer systems is known, for example, from the Chemiker-Kalender, C. Synowietz and K. Schäfer, Springer Verlag (1984), pp. 534–538.

It is preferred to use a hydrogenphosphate/dihydrogenphosphate phosphate, diethylbarbituric acid/diethyl barbiturate, boric acid/borate system and, most preferably, a carbonate/hydrogencarbonate buffer system.

In the process of this invention, the procedure preferably comprises either adding the weak acid to the aqueous solution of resorcinol and adjusting the desired pH by adding a strong base, for example sodium hydroxide solution or, more preferably, first adding the salt of a weak acid, for example sodium carbonate, and then adjusting the desired pH with a strong acid, for example hydrochloric acid.

The buffered solution of the coupling component has a temperature of, for example, −5° to 30° C. and, preferably, 0° to 15° C., before the addition of the diazo compound.

The diazotisation of the diazo compound is effected in a manner known per se, for example in a mineral acid medium and preferably in a solution containing hydrochloric acid using a nitrite, for example an alkali metal nitrite such as sodium nitrite, in the temperature range from, for example, −5° to 30° C. and, preferably, from 0° to 20° C. Any excess nitrite is conveniently destroyed before the further reaction in known manner, for example with sulfamic acid.

The stream a) contains, for example, 0.5 to 3.0 mol, preferably 0.5 to 2.0 mol and, most preferably, 0.6 to 1.5 mol, of diazo component per mol of resorcinol. If several different diazo components are coupled in succession with resorcinol, which is the preferred procedure, then, for example, 0.5 to 2.0 mol, preferably 0.6 to 1.5 mol and, most preferably, 0.65 to 1.2 mol, of each of the diazo components per mol of resorcinol will be added.

Exemplary of suitable bases for the stream b) are alkali metal hydroxides such as potassium or sodium hydroxide, alkali metal carbonates, ammonia or organic amines. It is preferred to use potassium hydroxide and, most preferably, sodium hydroxide, which hydroxides are used, for example, in the form of a 10 to 50%, preferably 25 to 40% aqueous solution.

The coupling reactions are carried out under adiabatic conditions, that is virtually without heat exchange with the environment; accordingly the temperature rises during the coupling reaction and moves for example between −5° and 30° C.

An initial temperature in the range from from 0° to 5° C. has proved especially useful. During the coupling reaction, a rise in temperature to, for example, 10° to 20° C. then ensues.

The apparatus employed for the coupling reactions of the process of this invention will normally consist of one or more stirred vessels which are equipped with a pH-meter, an inlet for the coupling component and the buffer solution as well as two separate feed lines for a) the diazo component stream and b) the base stream. Each of the feed lines for the streams a) and b) is provided with a flow meter for regulating the actual volume of flow. The control of streams a) and b) is made by means of a flow ratio controller for example semi-automatically or, preferably, automatically by computer. Flow ratio control measurements are known in chemical process technology and are, for example, a means of maintaining reaction stoichiometry in chemical processes.

In the process of this invention, the procedure is such that the flow in the feed line of one of streams a) or b) is measured and the other flow b) or a) is used as manipulated variable. Synchronisation of the flows a) and b) is made with a ratio meter which determines the nominal value for the flow b) or a) from the actual value of the flow a) or b) and from the flow ratio a)/b) and transmits it to a regulator which, in turn, controls the stream b) or a), for example by means of a suitable valve. In the process of this invention, it is preferred to measure the flow in the feed line of stream a) and from its actual value to determine and set the nominal value for the stream b).

Accordingly, the flow ratio control used in the practice of this invention is a sequential control. Changes, for example, in the flow a) effect a change in the nominal value for the control of flow b). The new nominal value ensures that the appropriate regulator valve changes the stream b) in the same manner as the stream a), so that, given a correct setting of the ratio meter, the pH remains constant within a narrow range.

Adjustment of the ratio meter may be made manually. For example, the pH of the coupling in the reactor is constantly monitored and deviations from the desired value of the process are corrected by altering the setting of the ratio meter by hand. However, control of the ratio meter is preferably made automatically, for example by means of a pH-regulator, which determines the nominal value for the ratio of the streams a) and b) from the actual pH value in the reactor which can be accessed by means of the pH measuring point in the reactor, and from the product-specific nominal value, and effects a corresponding adjustment of the ratio meter. Deviations of the pH from its specific nominal value thus lead via the manipulated variable of the pH-regulator to a change in the ratio in the ratio meter and hence to a change in the flow ratio of a)/b), so that the pH remains constant.

It is further often expedient in addition to provide the flow which does not act as manipulated variable, i.e. preferably the flow of the diazotised diazo component a), independently with a flow regulator so as to stabilise the mixture ratios in the coupling reactor and thereby to effect greater stabilisation of the pH. A suitable flow regulator consists, for example, of a regulator which controls a valve in the feed line by comparing the actual flow value with the nominal value. It effects a substantially constant addition of the solution a) or b) to the resorcinol solution.

The mono- and polyazo dyes obtainable by the process of this invention, which are often a complex mixture of different components, are isolated in a manner which is known per se, conveniently in the form of their salts, preferably alkali metal salts, most preferably sodium or potassium salts, or ammonium salts.

The apparatus and components used for carrying out the process of this invention, for example stirred reactor, pH-meter, flowmeter, ratio meter, regulator, control valves and the like, are known per se, for example from the standard works of chemical or automation technology.

The process of this invention makes it possible to control and keep constant the pH of the reaction mixture in coupling reactions with resorcinol very accurately and with low tolerances of, for example, not more than $\pm 0.5$ pH units and, preferably, not more than $\pm 0.2$ pH units. Accordingly, mono- and polyazo dyes can be prepared on an industrial scale in uniform high quality and yield using resorcinol as coupling component. By keeping the pH constant is meant quite generally the maintenance of the actual pH value in the reactor, irrespective of the reaction temperature, measured with a pH-meter. When the process is carried out under adiabatic conditions, this "measured" pH value deviates from the "actual" pH value, i.e. from the pH based on the temperature at the start of the coupling reaction, as the pH is temperature-dependent and, in particular, a rise in temperature results in a lowering of the pH.

Although it is preferred to keep the pH constant during a coupling reaction in the practice of this invention, a control of the pH with any linear or non-linear gradient is also possible. The course of the pH during a coupling reaction can, for example, rise or fall linearly or can also be curved. The dyes obtainable by the process of this invention are readily water-soluble anionic dyes which are generally suitable for dyeing textile and non-textile substrates which are dyeable with anionic dyes, for example for dyeing fibre materials of natural or regenerated cellulose such as cotton, synthetic polyamides such as nylon, wool, silk, polyurethanes or basically modified polyolefins and, preferably, for dyeing leather.

The dyeings produced with the dyes obtainable by the process of this invention have good application and tinctorial properties, for example good fastness to light, water, washing perspiration, dry cleaning, acid, alkali, solvents and diffusion to soft PVC, good resistance to electrolytes such as sodium or calcium salts, as well as to iron, chromium, cobalt or copper salts, and have a good build-up on pure chrome leather and on retanned leather.

The invention is illustrated by the following non-limitative Examples, in which parts and percentages are by weight.

EXAMPLE 1:

750 parts of an aqueous solution containing 20% by weight of sodium carbonate and 19 parts of resorcinol are charged to a stirred reactor equipped with pH-meter, inlet for the coupling component and the buffer solution, and two separate feed lines for the diazo stream a) and the base stream b) which are in turn provided with flowmeters and are coupled to each other via a flow ratio controller. The solution is cooled to 0° C. bulked with water to a volume 2 300 parts, and adjusted to pH 8.6 immediately before the first coupling.

Under adiabatic conditions, 7,000 parts by volume of an aqueous suspension containing 55.1 parts of 1-amino-8-hydroxynaphthalene-3,6-disulfonic acid, which have been diazotised in a manner known per se, are run into the above solution through the feed line a) and 25% sodium hydroxide solution through the feed line b), and the streams of a) and b) are controlled by the flow ratio controller such that the pH remains constant at $8.6 \pm 0.2$. The flow ratio controller consists of a ratio meter which determines the nominal value for the flow b) from the actual value of the flow a) and the adjusted flow ratio of a)/b) of ca. 9 to 10 and transmits it to a regulator which, in turn, controls the flow b) by a valve. The flow ratio a)/b) adjusted at the ratio meter is, however, not constant, but is controlled by a pH-regulator which determines the nominal value for the flow ratio a)/b) from the pH of the reaction measured by the pH-meter and from the given nominal pH value of 8.6, and effects a corresponding adjustment.

Upon completion of the first coupling, the temperature of the reaction mixture is adjusted to ca. 5° C. with ice and, in the same manner as before in the first coupling, the diazo compound, consisting of 35.7 parts of 4-nitroaniline, and 25% sodium hydroxide solution are run into the reaction mixture of the 1st step. The nominal pH value is 8.5–8.6 and the flow ratio of a)/b) is ca. 14 to 17.

Upon completion of the second coupling, the temperature of the reaction mixture is adjusted with ice to ca. 5° C. and, in the same manner as in the previous couplings, the diazo compound consisting of 20.2 parts of 2-amino-4-nitrophenol-6-sulfonic cid and 25% sodium hydroxide solution are run into the reaction mixture of the second step at a flow ratio of a)/b) of ca. 6 to 8, the nominal pH value being 8.5–8.6.

Upon completion of the third coupling, the dye is salted out with a mixture of potassium chloride and sodium chloride, isolated by filtration, and dried. The dye conforms very well to standard type and dyes leather in a brown shade of good allround fastness properties.

EXAMPLE 2

The procedure of Example 1 is repeated, additionally providing the feed line a) with a separate flow regulator consisting of a regulator which controls a valve in the feed line a) by comparing the actual value with the nominal value, to give the identical dye which conforms particularly well to standard type.

EXAMPLE 3

750 parts of an aqueous solution containing 20% by weight of sodium carbonate and 19 parts of resorcinol are charged to a stirred reactor equipped with pH-meter, inlet for the coupling component and the buffer solution, and two separate feed lines for the diazo stream a) and the base stream b) which are in turn provided with flowmeters and are coupled to each other via a flow ratio controller. The solution is cooled to 0° to 5° C. and adjusted to pH 8.2 immediately before the first coupling.

Under adiabatic conditions, 12 000 parts by volume of an aqueous suspension containing 49.8 parts of 4-(4'-sulfophenylazo)aniline, which have been diazotised in a manner known per se, are run into the above solution through the feed line a) and 25% sodium hydroxide solution through the feed line b), and the streams of a) and b) are controlled by the flow ratio controller such that the pH remains constant at 8.2±0.2.

The flow ratio controller consists of a ratio meter which determines the nominal value for the flow b) from the actual value of the flow a) and the adjusted flow ratio of a)/b) of ca. 10 to 12 and transmits it to a regulator which, in turn, controls the flow b) by a valve. The flow ratio a)/b) adjusted at the ratio meter is, however, not constant, but is controlled by a pH-regulator which determines the nominal value for the flow ratio a)/b) from the pH of the reaction measured by the pH-meter and from the given nominal pH value of 8.2, and effects a corresponding adjustment.

When the addition is complete, the reaction mixture is stirred for ca. ½ hour, then the pH of the reaction mixture is raised to 9.5 by addition of 25% sodium hydroxide solution, and stirring is continued for a further ½ hour at pH 9.5±0.2.

Upon completion of the first coupling, the temperature of the reaction mixture is adjusted to ca. 5° C. with ice and, in the same manner as before in the first coupling, the diazo compound, consisting of 31.3 parts of aniline-4-sulfonic acid, and 25% sodium hydroxide solution are run into the reaction mixture of the 1st step at a flow ratio of a)/b) of ca. 14 to 17, the nominal pH value being 9.3–9.5.

Upon completion of the second coupling, the reaction mass is adjusted to pH 3 with concentrated HCl and the dye is salted out with sodium chloride, isolated by filtration, and dried. The dye conforms very well to standard type and dyes leather in a reddish-brown shade of good allround fastness properties.

EXAMPLE 4

750 parts of water, 35 parts of sodium acetate and 19 parts of resorcinol are charged to a stirred reactor equipped with pH-meter, inlet for the coupling component and the buffer solution, and two separate feed lines for the diazo stream a) and the base stream b) which are in turn provided with flowmeters and are coupled to each other via a flow ratio controller. The solution is cooled to 0° to 5° C. and adjusted to pH 4.5–4.7 immediately before the first coupling.

Under adiabatic conditions, 2 400 parts by volume of an aqueous suspension containing 25.9 parts of aniline-3-sulfonic acid, which have been diazotised in a manner known per se, are run into the above solution through the feed line a) and 25% sodium hydroxide solution through the feed line b), and the streams of a) and b) are controlled by the flow ratio controller such that the pH remains constant at 5.0±0.2.

The flow ratio controller consists of a ratio meter which determines the nominal value for the flow b) from the actual value of the flow a) and the adjusted flow ratio of a)/b) of ca. 12 to 15 and transmits it to a regulator which, in turn, controls the stream b) by a suitable valve. The flow ratio a)/b) adjusted at the ratio meter is, however, not constant, but is controlled by a pH-regulator which determines the nominal value for the flow ratio a)/b) from the pH of the reaction measured by the pH-meter and from the given nominal pH value of 5.0, and effects a corresponding adjustment.

Upon completion of the addition, the reaction mass is stirred for 1 hour and the dye is salted out with sodium chloride, isolated by filtration, and dried. The dye conforms very well to standard type and dyes leather in an orange shade of good allround fastness properties.

What is claimed is:

1. A process for coupling one or more diazo components with resorcinol by charging a reactor with an aqueous solution of resorcinol, adjusting the pH of the coupling to the desired value and running in separately from each other a) the mineral acid containing solution of the diazotised diazo component or, in succession, the mineral acid containing solutions of the different diazotised diazo components, and b) the solution of a base, which process comprises carrying out the coupling reaction under adiabatic conditions and adjusting and stabilising the coupling pH of the resorcinol in the reactor prior to the reaction with the aid of a buffer system, and keeping the pH constant during the coupling reaction or reactions by controlling the flow ratio of the streams a) and b), and wherein the coupling reactions are carried out in a pH range from 3 to 12 and at a temperature from −5° to 30° C.

2. A process according to claim 1, wherein the diazo components are 1- or 2-naphthylamines and/or aminobenzenes, which are each unsubstituted or further substituted by sulfo, nitro, $C_1$–$C_4$alkyl, $C_1$–$C_4$alkoxy, carboxy, hydroxy, halogen or by phenylamino which may be substituted in the phenyl moiety by nitro, sulfo, $C_1$–$C_4$alkyl, $C_1$–$C_4$alkoxy or halogen.

3. A process according to claim 1, which comprises coupling in succession two, three or four identical or different diazo components with resorcinol.

4. A process according to claim 1, which comprises coupling in succession two, three or four different diazo components selected from the group consisting of 1-amino-8-hydroxynaphthalene-3,6-disulfonic acid; o-, m- or p-nitroaniline; 4-amino-4-nitrodiphenylamine-2-sulfonic acid; 6-nitro-4-sulfo-2-aminophenol; 4-nitro-6-sulfo-2-aminophenol and 4- or 5-nitro-2-aminophenol with resorcinol.

5. A process according to claim 1, which comprises carrying out the coupling reactions at a pH of 7.5 to 12.

6. A process according to claim 1, which comprises using a buffer system selected from hydrogenphosphate/dihydrogenphosphate, diethylbarbituric acid/-diethyl barbiturate, boric acid/borate and carbonate/-hydrogencarbonate.

7. A process according to claim 6, which comprises using a carbonate/hydrogencarbonate buffer system.

8. A process according to claim 1, wherein 0.5 to 2.0 mol of diazo component is used per mol of resorcinol.

9. A process according to claim 1, wherein the base is selected from the group consisting of alkali metal hydroxide, alkali metal carbonate, ammonia and an organic amine.

10. A process according to claim 9, wherein the base is an alkali metal hydroxide.

11. A process according to claim 1, wherein the flow ratio control of the streams a) and b) is made automatically by computer.

12. A process according to claim 11, which comprises carrying out the flow ratio control such that the flow in the feed line of the stream a) is measured and, from its actual value, the nominal value for the stream b) is determined and set.

13. A process according to claim 12, wherein the feed line a) is independently provided with a separate flow control.

14. A process according to claim 5, wherein the coupling reactions are carried out at a pH of 8.0 to 9.0.

15. A process according to claim 8, wherein 0.6 to 1.5 mol of diazo component is used per mol of resorcinol.

16. A process according to claim 10, wherein the base is a sodium hydroxide.

* * * * *